(12) United States Patent
Mutschler et al.

(10) Patent No.: US 10,675,597 B2
(45) Date of Patent: Jun. 9, 2020

(54) BEVERAGE CONTAINER AND LID ASSEMBLY

(71) Applicant: FLEX QUENCH, LLC, Belle Vernon, PA (US)

(72) Inventors: Thomas A. Mutschler, Belle Vernon, PA (US); Lorie M. Mutschler, Belle Vernon, PA (US); Mary Ann Orlando, Belle Vernon, PA (US); Scott A. Jones, McMurray, PA (US); Vicki L. Jones, McMurray, PA (US)

(73) Assignee: FLEX QUENCH, LLC, Belle Vernon, PA (US)

( * ) Notice: Subject to any disclaimer, the term of this patent is extended or adjusted under 35 U.S.C. 154(b) by 0 days.

(21) Appl. No.: 16/388,998

(22) Filed: Apr. 19, 2019

(65) Prior Publication Data
US 2019/0308144 A1 Oct. 10, 2019

Related U.S. Application Data

(63) Continuation of application No. 15/144,131, filed on May 2, 2016, now Pat. No. 10,300,440.
(Continued)

(51) Int. Cl.
| | |
|---|---|
| *B01F 3/00* | (2006.01) |
| *B01F 3/08* | (2006.01) |
| *B65D 51/28* | (2006.01) |
| *A47G 19/22* | (2006.01) |
| *A23L 2/56* | (2006.01) |
| *A23L 2/72* | (2006.01) |
| *B01F 5/04* | (2006.01) |
| *B65D 47/06* | (2006.01) |

(Continued)

(52) U.S. Cl.
CPC .............. *B01F 3/0865* (2013.01); *A23L 2/52* (2013.01); *A23L 2/56* (2013.01); *A23L 2/72* (2013.01); *A47G 19/2272* (2013.01); *B01F 5/0428* (2013.01); *B01F 13/0022* (2013.01); *B01F 13/1058* (2013.01); *B01F 15/0206* (2013.01); *B65D 47/06* (2013.01); *B65D 47/32* (2013.01); *B65D 51/2821* (2013.01); *B01F 2005/0433* (2013.01)

(58) Field of Classification Search
CPC ....................... B01F 2005/0433; B01F 3/0865
See application file for complete search history.

(56) References Cited

U.S. PATENT DOCUMENTS

| | | | |
|---|---|---|---|
| 10,300,440 B2 * | 5/2019 | Mutschler | ............. B01F 3/0865 |
| 2004/0144792 A1 | 7/2004 | Naesje | |
| 2012/0193362 A1 | 8/2012 | Porter | |

\* cited by examiner

*Primary Examiner* — Anshu Bhatia
(74) *Attorney, Agent, or Firm* — Dentons Cohen & Grigsby P.C.

(57) ABSTRACT

A beverage container may comprise a beverage container lid assembly comprising at least one concentrate well to hold a concentrate vessel, a concentrate vessel retainer for each concentrate well to secure the concentrate vessel in the concentrate well, a feed line for each concentrate well comprising a feed line needle to puncture the concentrate vessel in the at least one concentrate well, a Venturi mixer in fluid communication with each feed line, a mixing valve in fluid communication with each feed line, wherein fluid flows from the concentrate vessel to the Venturi mixer when the mixing valve is open and the concentrate vessel is punctured by the feed line needle. Methods of using the beverage container and beverage container lid assembly are also described.

20 Claims, 13 Drawing Sheets

Related U.S. Application Data

(60) Provisional application No. 62/155,534, filed on May 1, 2015.

(51) Int. Cl.
*B65D 47/32* (2006.01)
*A23L 2/52* (2006.01)
*B01F 13/00* (2006.01)
*B01F 13/10* (2006.01)
*B01F 15/02* (2006.01)

SECTION A-A

SECTION D-D

DETAIL E
SCALE 3:2

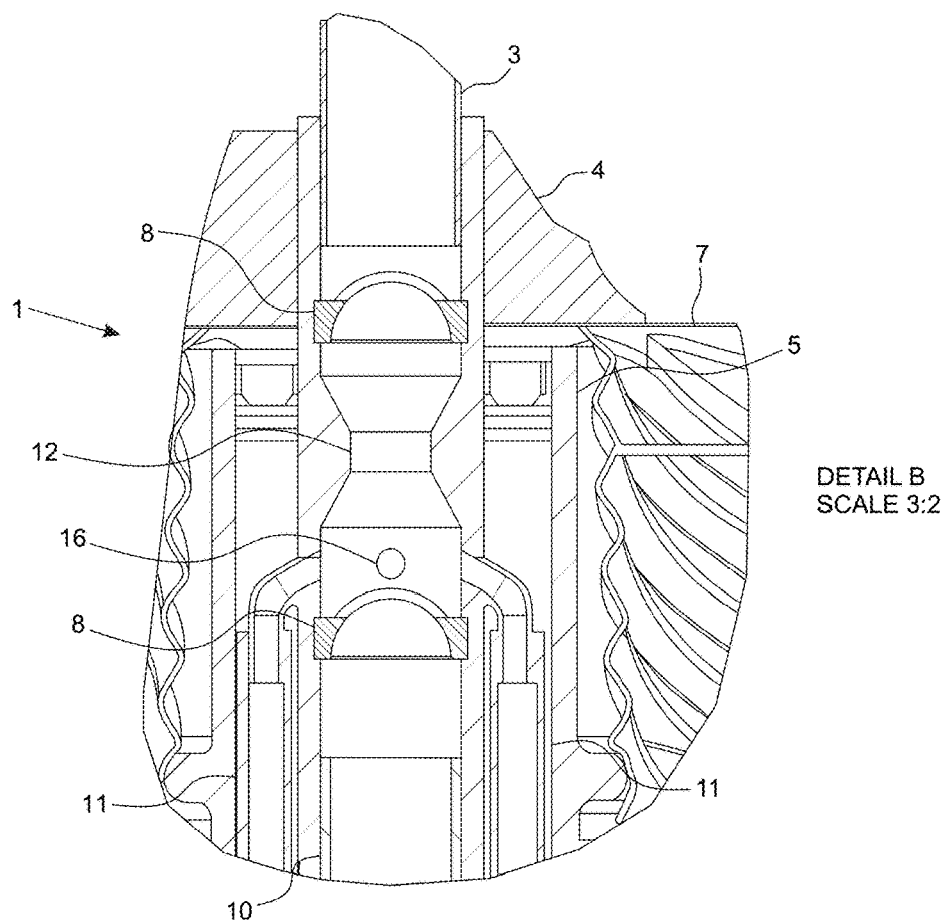
Fig. 5A
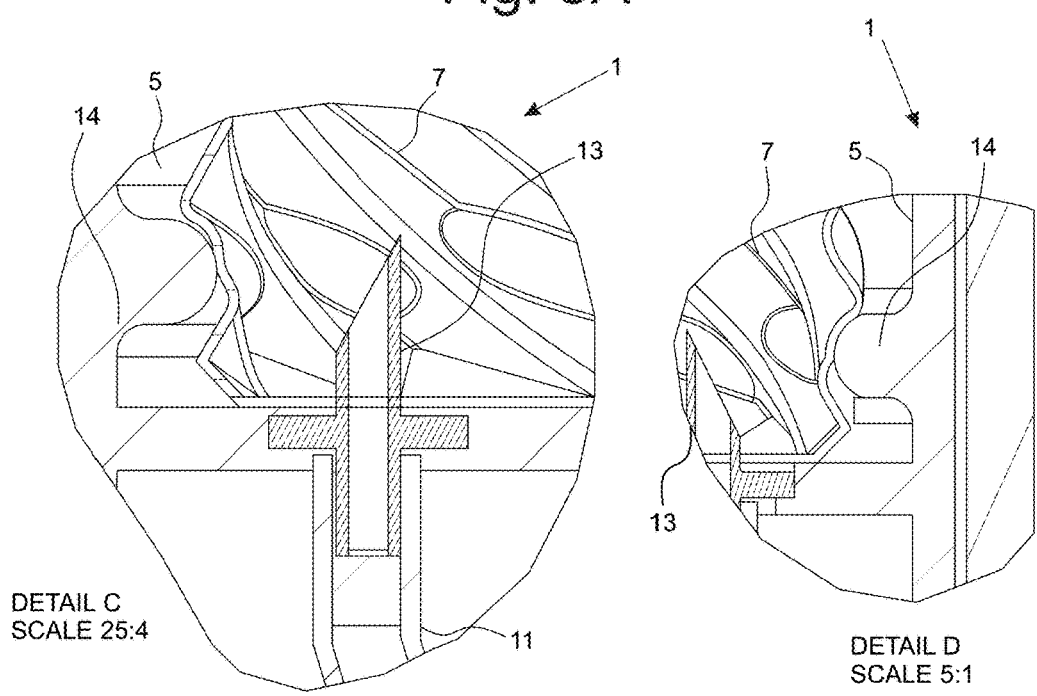
Fig. 5B
Fig. 5C

DETAIL A
SCALE 5:4

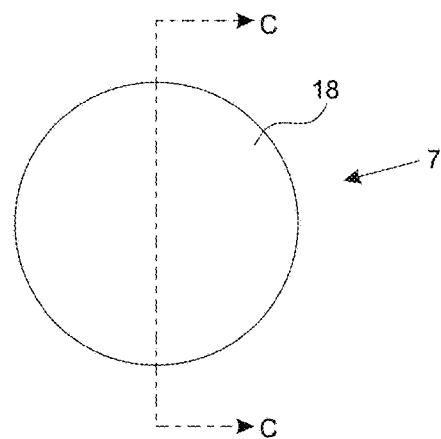
Fig. 7A
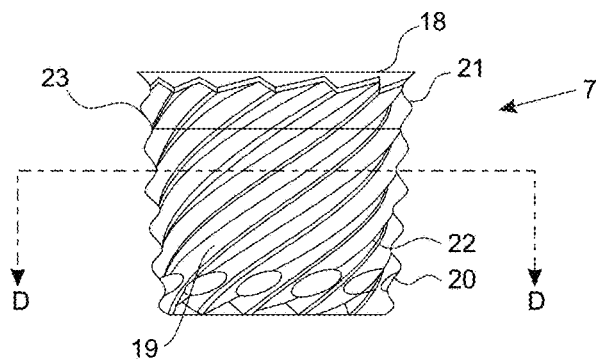
Fig. 7B
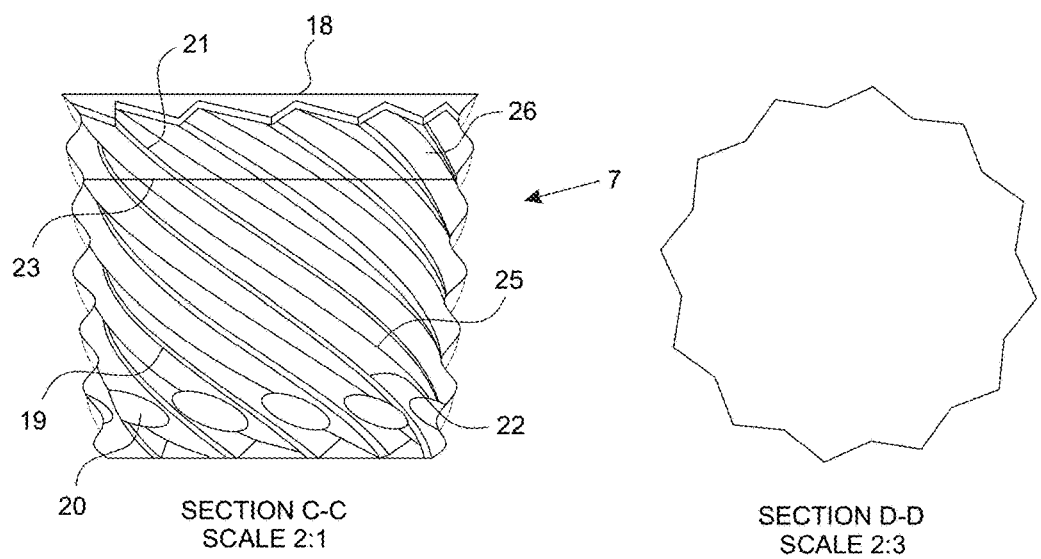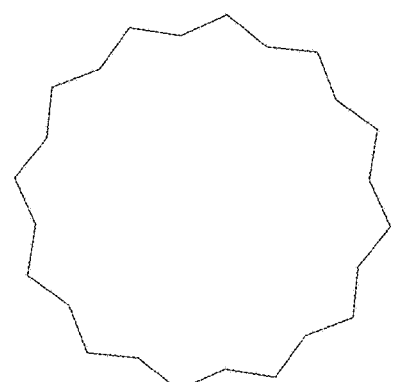
Fig. 7C
Fig. 7D

Assembled Container

Assembly Container
Opened

Lid Assembly - Top View

Lid Assembly
Bottom View

Lid - Assembly
Cut Away

Seal Plate

BEVERAGE CONTAINER AND LID ASSEMBLY

CROSS REFERENCE TO RELATED APPLICATION

This application is a Continuation of U.S. Ser. No. 15/144,131, which claims the benefit of U.S. Provisional Application No. 62/155,534, filed May 1, 2015, all of which are incorporated by reference herein in its entirety.

FIELD OF INVENTION

The present inventions generally relate to beverage containers, and more particularly to portable beverage containers and lid assemblies for portable beverage containers.

BACKGROUND

For some time, people have recognized the need to stay hydrated. Beverage containers come in a variety of shapes and configurations and may be used to carry a variety of beverages, such as water or other potable beverages, for consumption by a user. Associated with such hydration is the use of additives, such as drink mixes, that may be added to the water to add flavor and/or nutritional/health supplements to increase the enjoyment and/or health benefit of remaining hydrated. Typically, such mixes are poured into the reservoir of the open beverage container either before or after the water is added and then the beverage container is closed by a lid. Some conventional drink bottles include a spout, or nozzle, from which the drink mixture may be drawn from the reservoir without removing the cap of the drink bottle. Conventional spouts include straws and rigid spouts having an outlet through which drink fluid may flow. Other conventional drink bottles require the cap to be removed to permit drink fluid to be removed from the drink bottle.

SUMMARY

The present invention may be used to mix a liquid and one or more beverage concentrates. The concentrate vessels may be placed in a cap assembly and in doing so the bottom of the concentrate vessel may be punctured by a concentrate feed needle. The choice of whether and which concentrate(s) are selected may be controlled by individual mixing valves. Rotating the mixing valve may open the feed line to the Venturi mixer and also meter the amount of concentrate dispensed. Suction applied to the straw may produce a differential pressure that draws and mixes the reservoir liquid and the concentrate(s) from the concentrate vessel(s). The desired mixture composition and strength may be changed as desired by adjusting the mixing valve(s). The backflow valves may reduce and/or prevent the Venturi mixture from leaking into the reservoir thereby allowing the remaining liquid in the reservoir to be mixed with the other of the concentrate(s) while remaining in its pure state. The liquid may be consumed in its pure state by merely keeping all of the concentrate mixing valves closed.

In one embodiment of the present invention the liquid in the reservoir remains unchanged.

Another embodiment allows modification of the mixture and its strength as desired.

Another embodiment allows mixing of different concentrates as desired.

Another embodiment allows for consumption of the unflavored liquid as desired.

DESCRIPTION OF FIGURES

The embodiments described herein may be better understood by reference to the accompanying figures, in which:

FIGS. 5A-5C illustrate detail views of the invention;

FIGS. 7A-7D illustrate top and side views of the concentrate vessel of the invention;

DETAILED DESCRIPTION

Figure 1A:
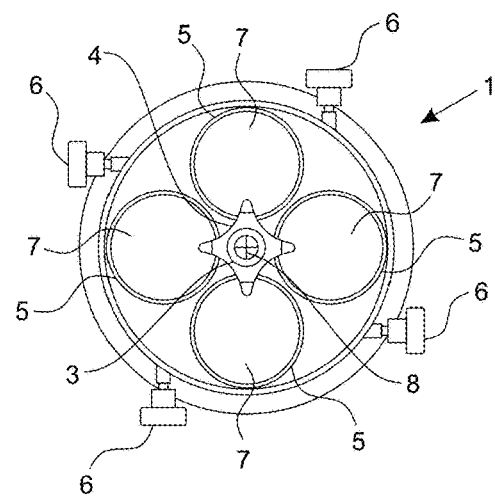
FIGS. 1A and 1B illustrate top and side views of the invention.
Figure 1B:
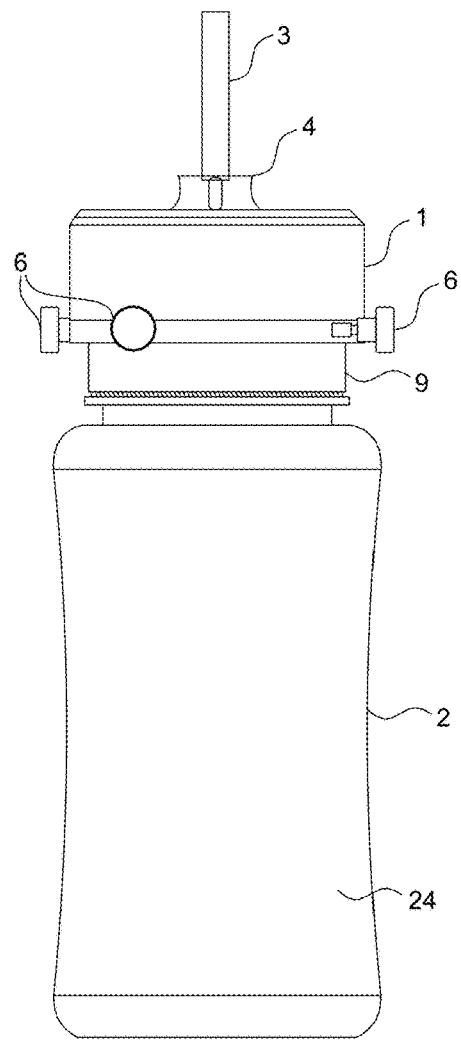
Figure 2A:
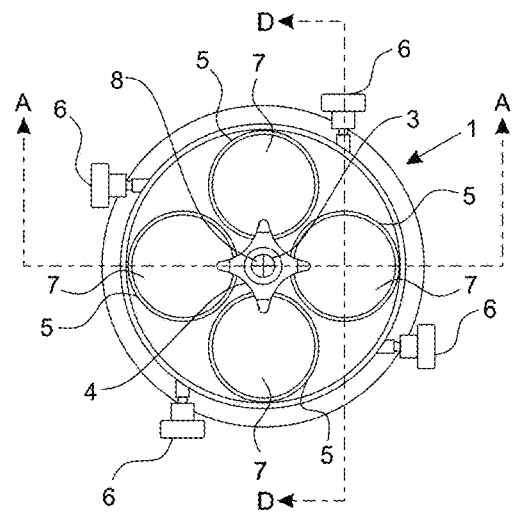
FIGS. 2A and 2B illustrate top view and cross-section of the invention.
Figure 2B:
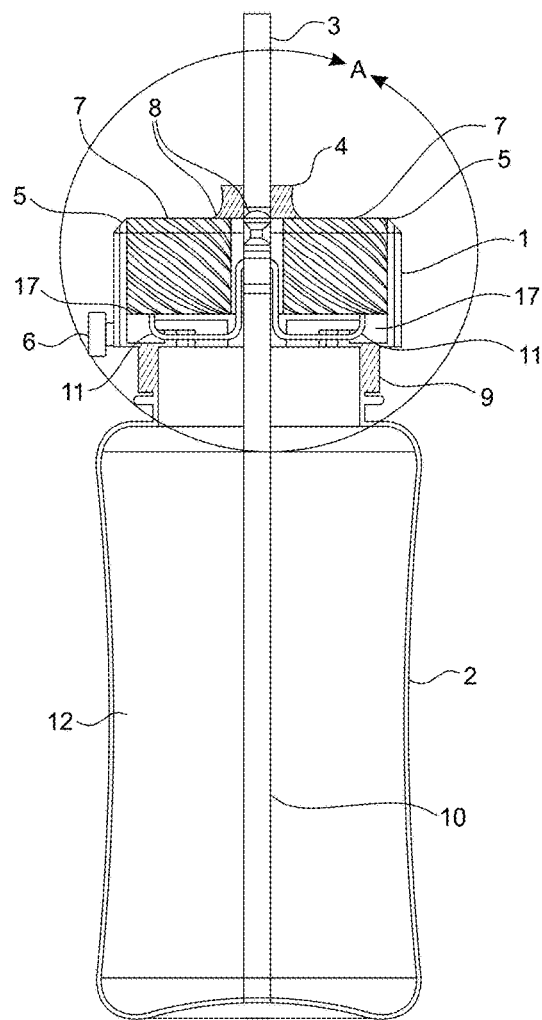
Figure 3:
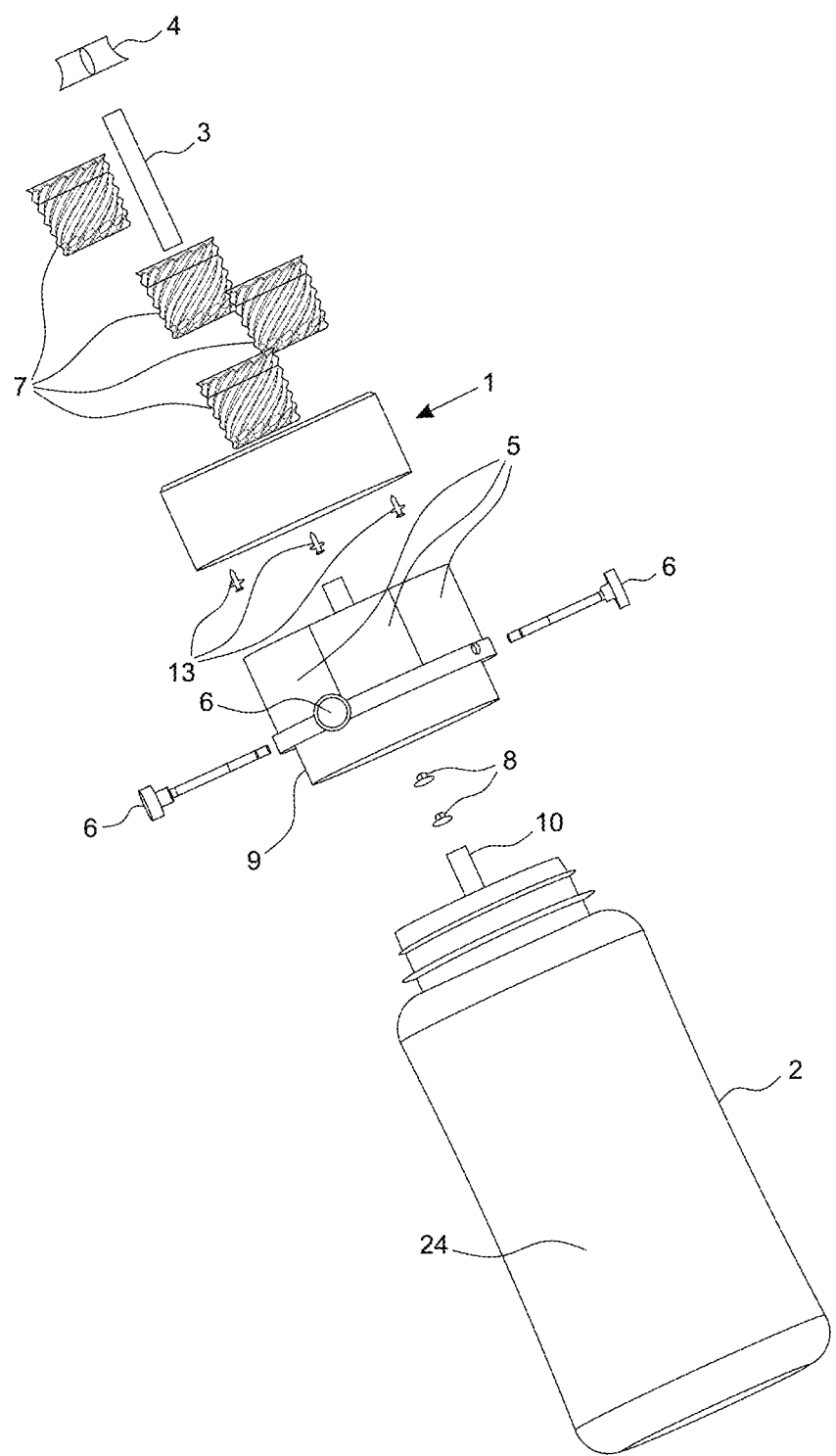
FIG. 3 illustrates an exploded view of the invention.
Figure 4A:
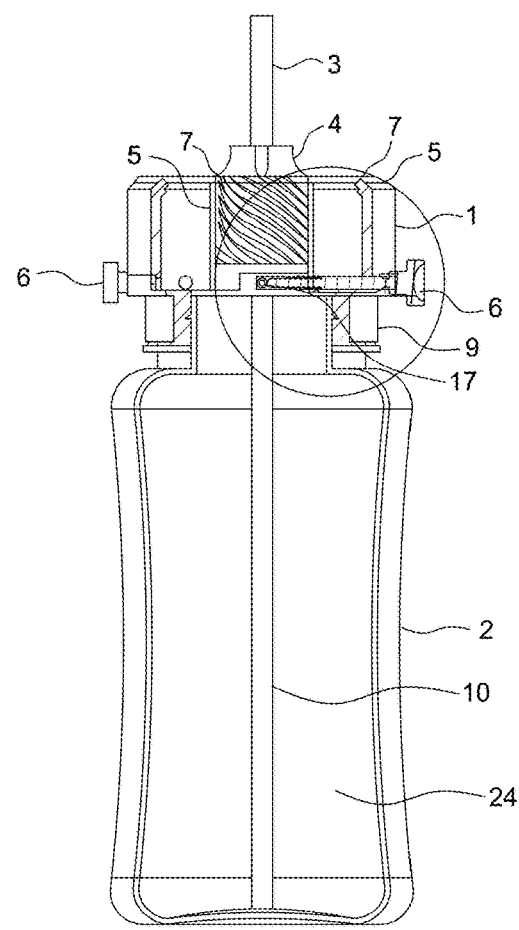
FIGS. 4A and 4B illustrate cross-section and detailed view of the invention.
Figure 4B:
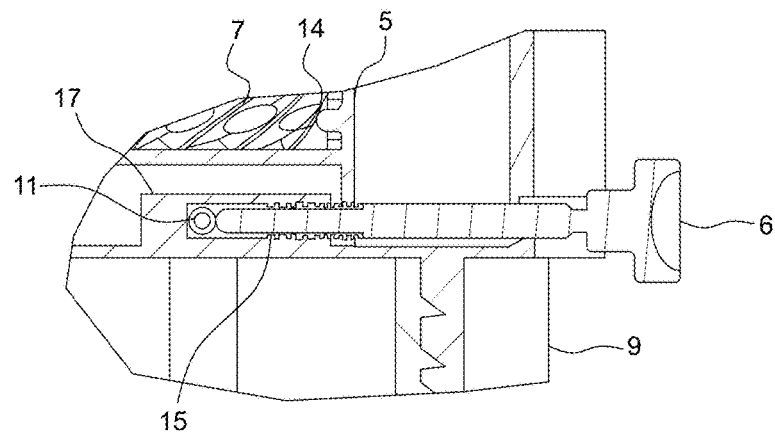
Figure 6:
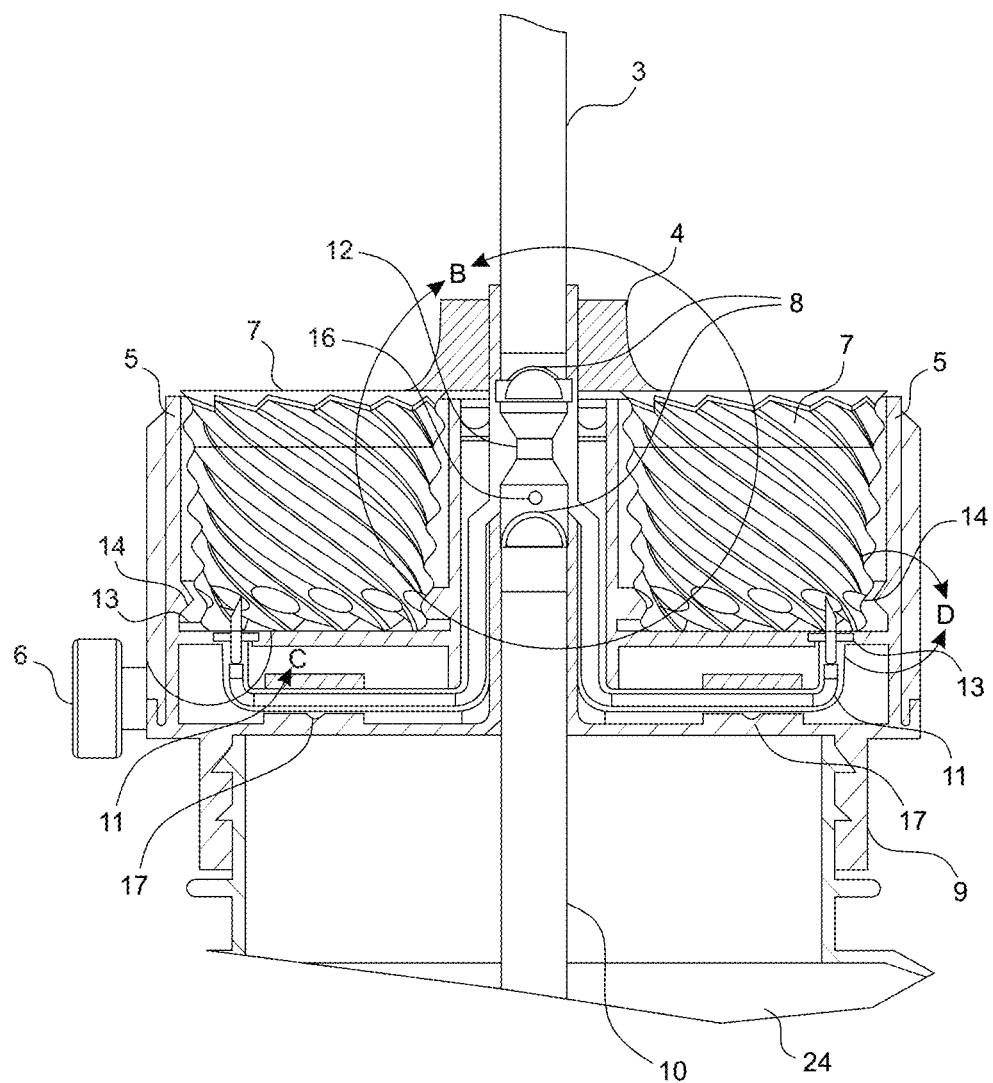
FIG. 6 illustrates cross-section view of the invention.
Figure 8:
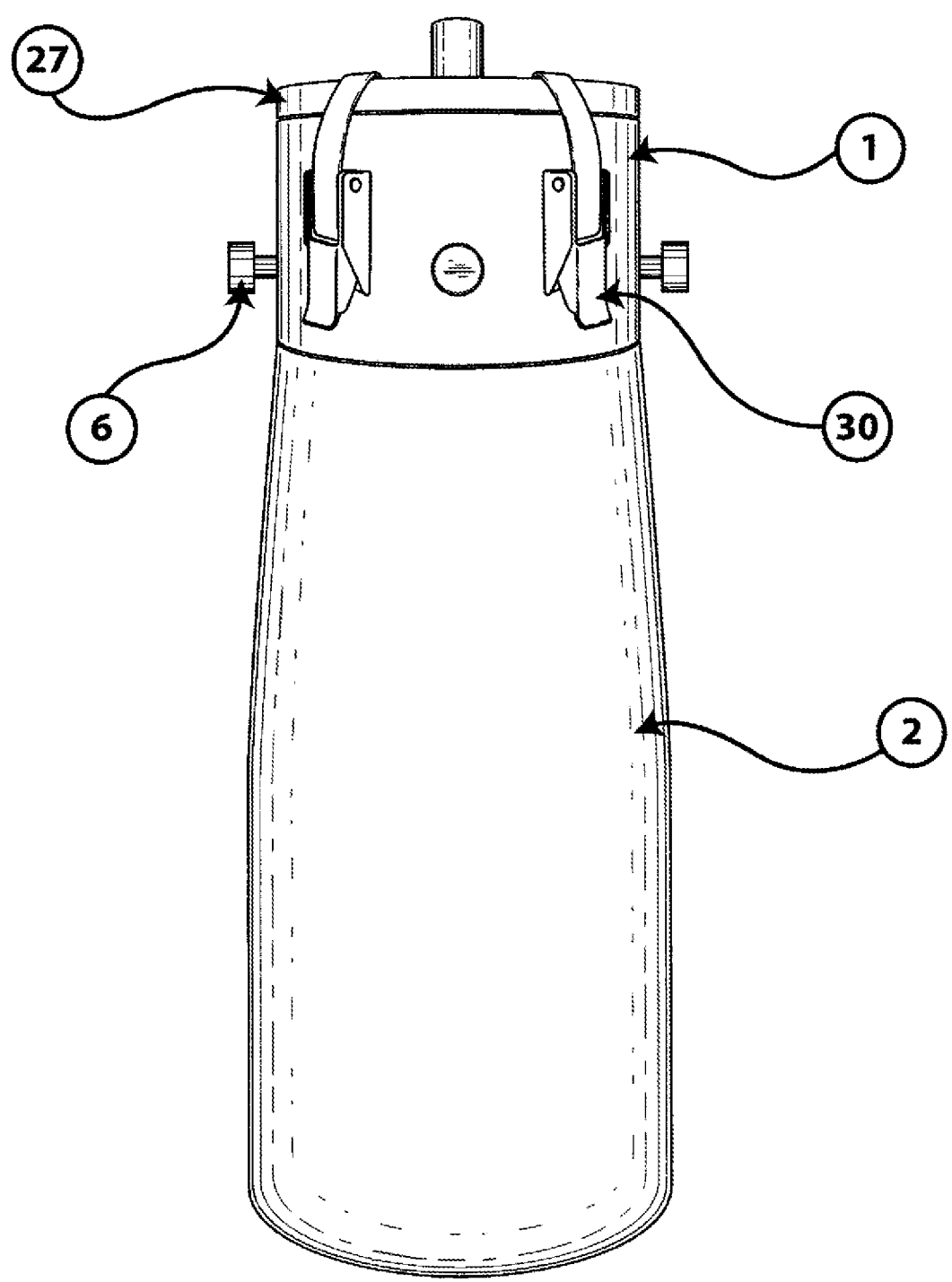
FIG. 8 illustrates a side view of the invention.
Figure 9:
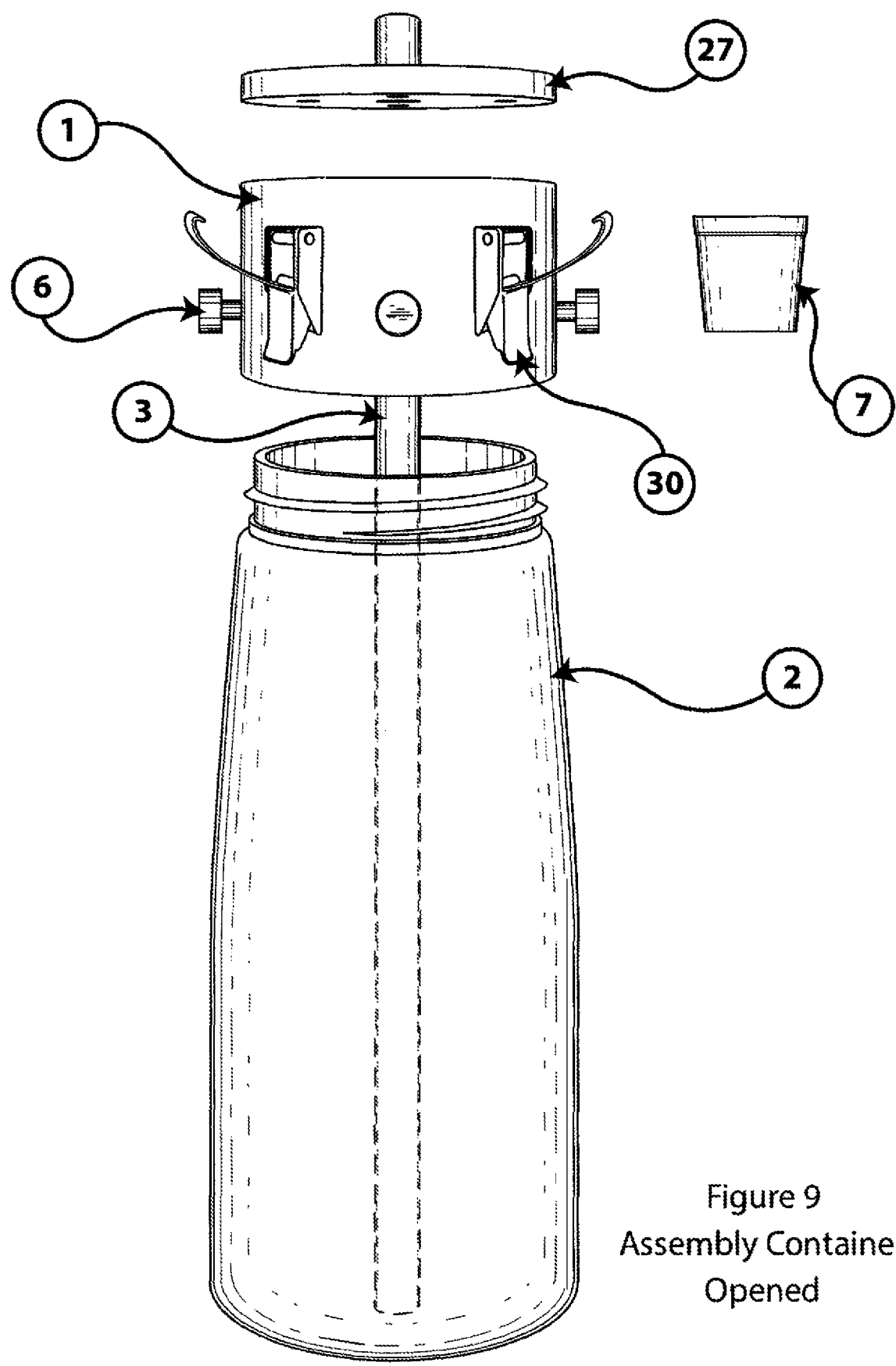
FIG. 9 illustrates a side view of the invention.
Figure 10:
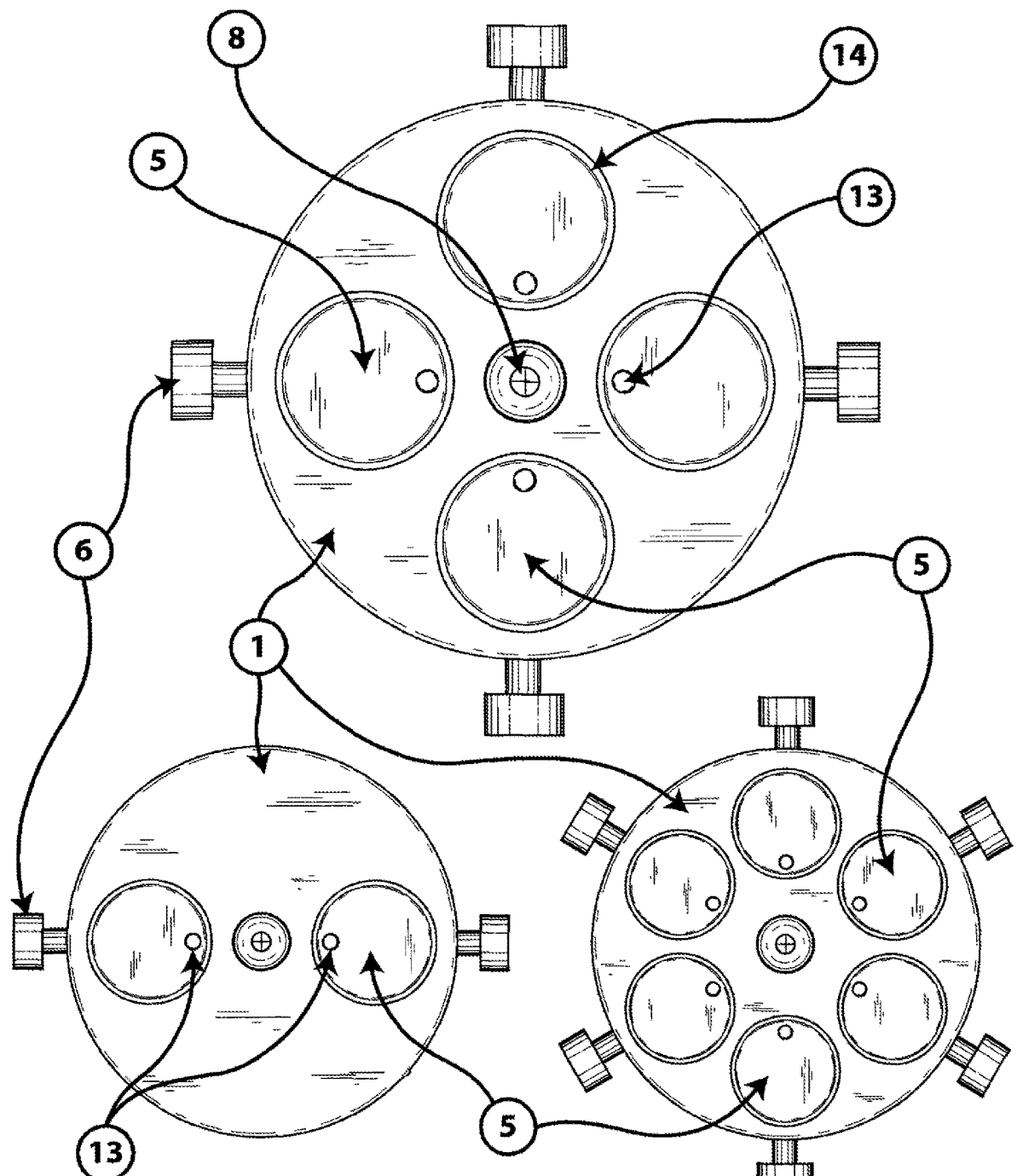
FIG. 10 illustrates a top view of the invention.
Figure 11:
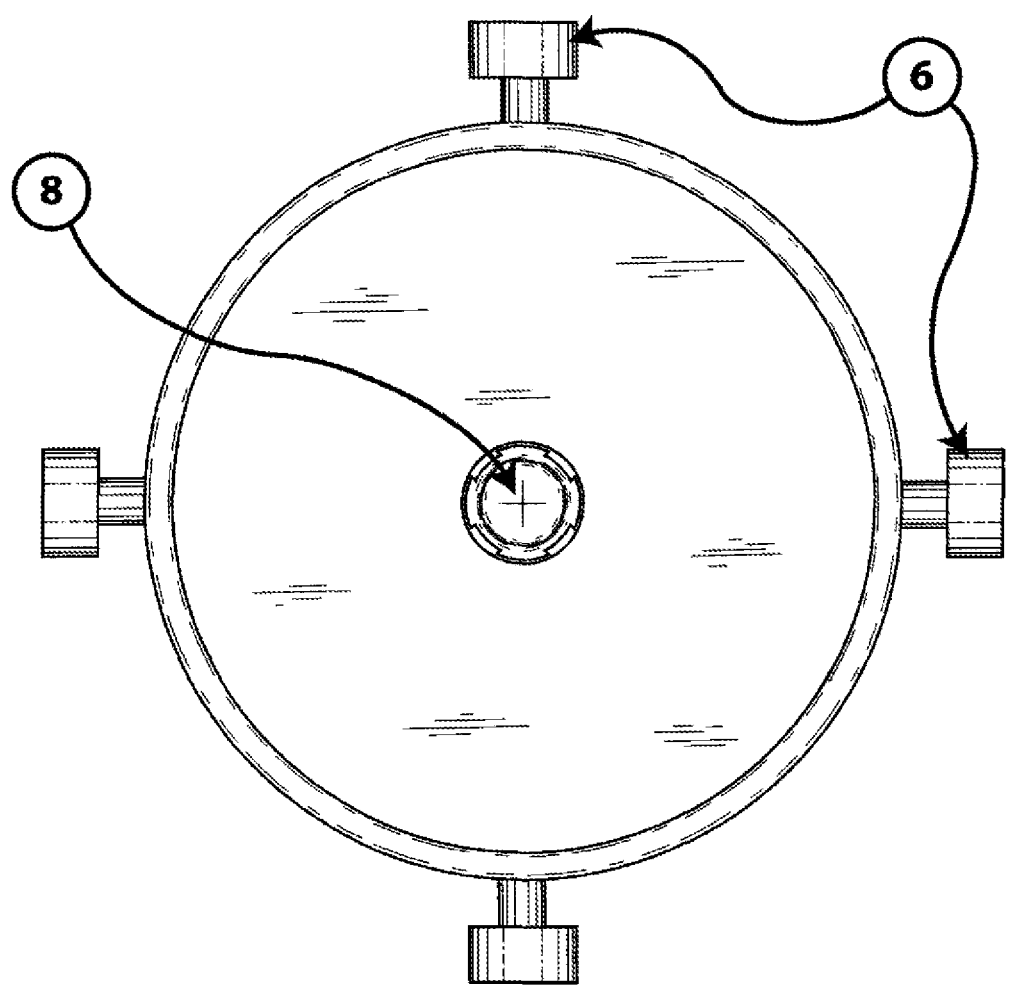
FIG. 11 illustrates a bottom view of the invention.
Figure 12:
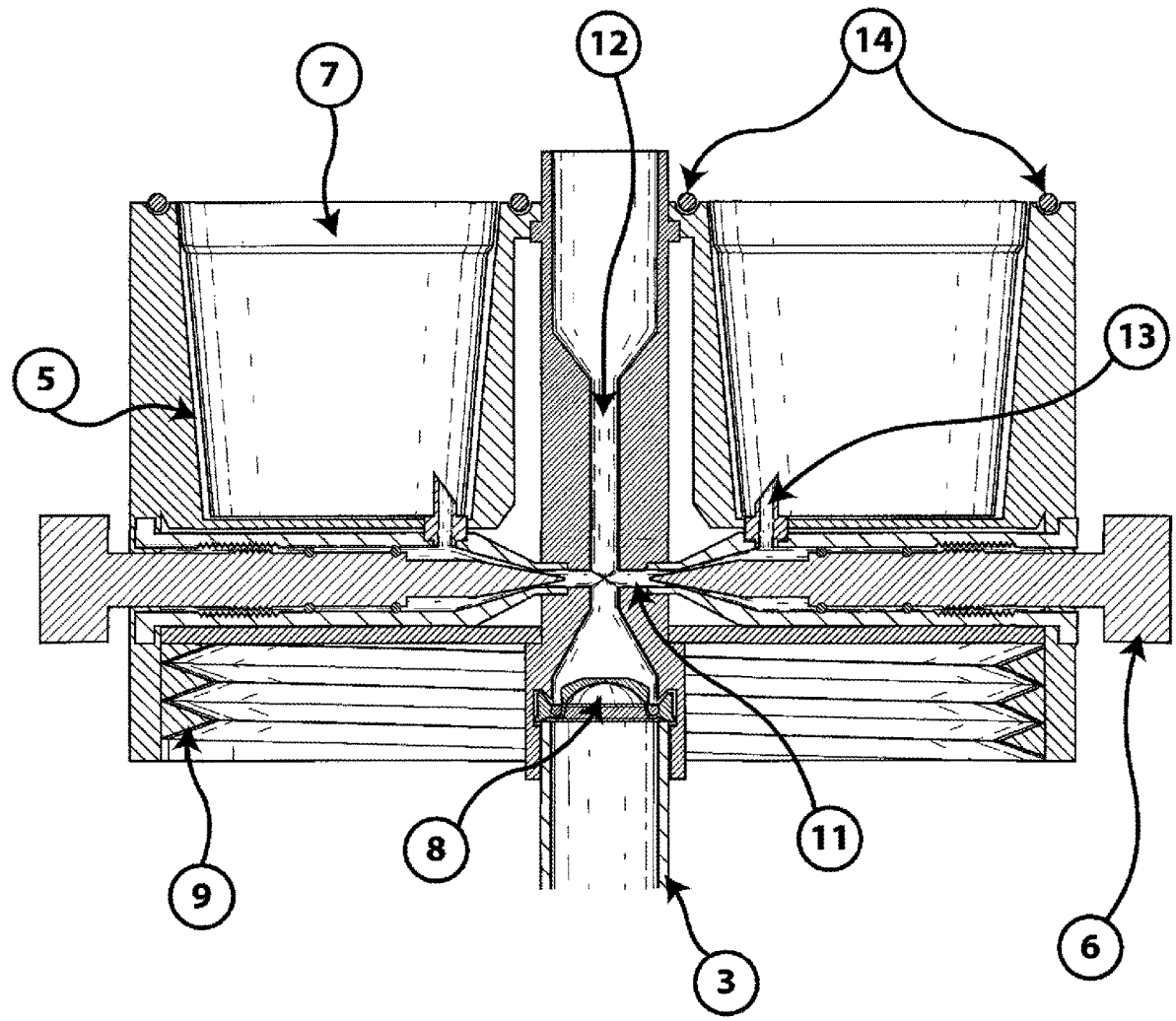
FIG. 12 illustrates a side view of the invention.

All numerical quantifies stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

Currently there are ways to add a concentrate to a liquid in a beverage container by adding the concentrate to the liquid in a reservoir thereby limiting the mixture to a single flavor and concentration. There are ways designed to produce more than one mixture, however they involve multiple chambers in the reservoir. This limits the amount of liquid available for a single mixture and also limits the ability to modify the strength of the mixture in the reservoir. Once a concentrate is selected and mixed with the liquid using the current technology they cannot be modified. The reservoir would have to be drained, rinsed and refilled. There is no ability to choose a mixture having more than a single flavor or adjust the mixture's strength at will.

The present invention comprises a device and method to mix or not mix a reservoir liquid and one or more beverage concentrates without changing the composition of the reservoir liquid while controlling the strength and composition of the mixture as desired.

The present invention comprises a device and method that offers multiple options for mixing one or more beverage concentrates and a liquid from a reservoir without changing the composition of the liquid in the reservoir.

The present invention comprises a device and method that allows the use of one or more beverage concentrates to be mixed with a liquid without changing the composition of the liquid in the reservoir until it is mixed at a Venturi valve. The user may drink an unflavored liquid and/or add a beverage concentrate to a sufficient amount of the unflavored liquid to adjust the strength of the mixture to achieve a desired strength. Additionally, two or more beverage concentrates may be mixed together. For example, a lemon-tea flavored beverage may be achieved by mixing together of a lemon flavoring concentrate and a tea flavored concentrate with water at the Venturi valve.

The beverage container may comprise an internal compartment that is sized to hold, or receive, up to a predetermined volume of a potable fluid. Typically, the container may hold up to 2 L of fluid, such as 4 oz., 6 oz., 8 oz., 10 oz., 12 oz., 16 oz., 20 oz., 24 oz., 32 oz., 36 oz., 0.5 L, 0.7 L, 1 L, 1.5 L, 6-11 oz., 12-19 oz., 19-25 oz., 12-36 oz., 25-36 oz, and 10-70 oz, for example. The container may have any suitable size and shape, including sizes that are smaller than, larger than, or within the volume sizes described above.

The container may be formed from any suitable material or combination of materials, including, but not limited to polycarbonate, polyethylene, polypropylene, glass, and metal. A collapsible container that is translucent or opaque, but not transparent, may comprise polyethylene. A rigid, or stiff, container that is clear or glass-like appearance without the fragility of glass may comprise polycarbonate. A container that is more translucent and stiffer than polyethylene yet still able to be collapsed during use by a user squeezing the wall structure of the fluid container may comprise polypropylene. The material(s) may be transparent, or at least translucent, so that a user may see the contents of the fluid container, or at least the level of drink fluid within the fluid container, through the walls, or wall structure, of the container. The material(s) may be rigid to resist being collapsed when a user drinks from the container. The material(s) may be collapsible to permit opposing portions of the wall structure to be urged toward, or even into contact with, each other during use. The containers may be collapsed during use by a user squeezing the container. The collapsible containers may be at least semi-rigid and thereby self-supporting. The material(s) may be shatter resistant, i.e., will not shatter into separate pieces when dropped.

The container may comprise a body including a base, or bottom surface, and a neck, with the bottom surface and the neck being separated by a wall structure. The bottom surface may support the container in an upright configuration on a level surface. The wall structure may have a cylindrical or other geometrically shaped configuration. The wall structure may have a central region having a generally tapered configuration. The central region of the wall structure may have a tapered configuration relative to an upper region and a lower region of the wall structure, and thereby a smaller internal perimeter. The cross-sectional configuration of the wall structure may be symmetrical throughout the upper, central, and lower regions, or at least one of the regions may have a cross-sectional configuration that is not symmetrical with the other regions and/or with respect to itself. The body may include a handle, or passage, that extends into, or through, the drink compartment. The body may include a handle that projects outwardly from the wall structure.

The neck may provide an opening, or portal, through which fluid may be poured into the internal compartment of the fluid container and/or removed therefrom. The neck may have a reduced cross-sectional area (or smaller perimeter) than the region of the fluid container from which it extends. The neck may interconnect, typically removably, with the cap assembly via any suitable mechanical interconnection, or coupling structure. The coupling structure may comprise threads or a friction fit assembly. The neck may include threads to be threadingly engaged by corresponding threads on the base of the cap assembly to permit the cap to be screwed, or threaded, onto the neck. The coupling structure may comprise a friction fit assembly, with neck including a coupling structure that includes an external lip, or ledge, over which a corresponding coupling structure in the form of a flange, or internal ledge, of the base of the cap assembly extends to couple the cap assembly onto the neck. The cap assembly and/or neck may form a fluid-tight seal therebetween without requiring the inclusion of gaskets, o-rings or seal-enhancing structure.

The cap assembly may be connected, and typically removably connected, to the neck of the fluid container. As generally used herein, "removably" refers to repeatedly connecting and disconnecting the cap assembly to and from the neck. When connected to the neck, the cap assembly may form a seal with the neck to selectively seal the internal compartment of the container to reduce and/or prevent fluid from being dispensed therefrom through the opening except as permitted by the cap assembly. One or more of the cap assembly and the neck may include a compressible gasket or other sealing structure to assist in providing a liquid-tight seal between the cap assembly and the neck when the container is sealed.

The container may comprise a straw that extends from the cap assembly into the container, such as to (or at least proximate) the lower region of the container. The straw may enable a user to draw fluid from the container. The straw may be removably (or permanently) coupled to a mount on the cap assembly. The straw may be fixedly, or permanently, attached to the cap assembly.

A beverage concentrate may be directly added in the reservoir 2 and/or a concentrate vessel comprising the beverage concentrate may be placed in the reservoir 2. Referring to the FIGS. 1B, 2B, 3, 4A, and 6, a liquid may be placed in the reservoir 2. Referring to FIGS. 1A, 1B, 2A, 2B, 3, 4A, 4B, 5A, 5B, 5C and 6, the cap assembly 1 may be then connected to the reservoir via the cap assembly/reservoir interface 9. Referring to FIGS. 1A, 2A, 2B, 3, 4A, 4B, 5A, 5B, 5C, 6, 7A, 7B, 7C and 7D, then concentrate vessels 7 may be placed in the concentrate wells 5. The device may comprise at least 1 concentrate well 5, such as 1 to 10, 2 to 8, 4 to 6, 2 to 4, 1, 2, 3, 4, 5, 6, 7, 8, 9, 10. FIGS. 1A, 2A, 2B, 4A, 4B, 5A, 5B, 5C and 6 show four concentrate wells 5. Referring to FIGS. 1A, 1B, 2A, 2B, 3, 4A, 4B, 5A and 6, the concentrate vessels may be then secured in the cap assembly by the concentrate vessel retainer 4. The concentrate vessels may be sealed in the concentrate wells by the concentrate vessel sealing mechanism 14, as shown in FIGS. 4B, 5B, 5C and 6. The concentrate vessel sealing mechanism 14 may reduce and/or eliminate leakage of concentrate out of the concentrate well 5.

Referring to FIGS. 2B, 3, 4B, 5A, 5B, 5C and 6, when pushed into the concentrate well 5, the concentrate vessel may be punctured by the feed line needle 13 allowing the beverage concentrate to flow through the feed line 11 to the Venturi feed line orifice 16. As shown in FIGS. 1A, 1B, 2A, 2B, 3, 4A, 4B and 6, the flow of the beverage concentrate may be metered by the mixing valve 6 by turning the mixing valve threads 15, which may be contained in the mixing valve housing 17. When a mixing valve 6 is closed, no beverage concentrate will flow through its feed line 11. The amount that the mixing valve 6 is opened may control the amount of beverage concentrate that flows through its corresponding feed line 11 thereby controlling the strength of the mixture at the Venturi mixer.

Referring to FIGS. 1A, 1B, 2A, 2B, 3, 4A, 5A and 6, when suction is applied at the straw 3, the reservoir liquid 24, may be pulled up from the reservoir through the reservoir tube/filter 10, through a back-flow valve 8, to the Venturi mixer 12. Without wishing to be held to any particular theory, the beverage concentrate may be pulled into the Venturi through the Venturi feed line orifice to mix with the reservoir liquid producing the desired mixture due to the differential pressure of the Venturi as determined by Bernoulli's Equation of fluid flow. The back-flow valve may prevent any of the mixture from flowing into the reservoir when the suction is stopped. The back-flow valve may keep the reservoir liquid pure or mostly pure, and ready to be used for a mixture as determined by the cap assembly mixing valve(s) position(s) and contents of the concentrate vessel(s).

Without wishing to be bound to any particular theory, movement of liquid through a first fluid line of the Venturi mixer creates a suction that causes concentrate to flow from the concentrate source through a second fluid line and into the first fluid line. That is, movement of the fluid in the first fluid line causes movement of the concentrate to the first fluid line. Such movement of the concentrate may be generated by a Venturi effect by using the Venturi mixer. The Venturi mixer may supply an amount of concentrate from the concentrate source to the first fluid line generally corresponding to the volumetric flow rate of the fluid in the first fluid line and through the Venturi mixer and the desired concentration of concentrate in the beverage to be dispensed. The Venturi mixer generally follows Venturi principles to supply concentrate to the first fluid line. Other valve types suitable for supplying an amount of concentrate in this manner may be used instead of, or in addition to, the Venturi mixer. The Venturi effect, as described herein, may be achieved without using the Venturi mixer. For example, the feed lines may be coupled to the straw, wherein the diameters of the feed lines and straw are configured to generate the Venturi effect.

Referring to FIGS. 7A-C, the concentrate vessel may comprise a bi-chambered vessel comprising a concentrate vessel upper chamber 21, and a concentrate vessel lower chamber 22, separated by a concentrate vessel partition 23. A first concentrate 25 may be housed in the lower chamber, and a second concentrate 26 may be housed in the upper chamber. The concentrate vessel partition may seal the lower chamber contents from the upper chamber contents. The concentrate vessel lid 18 may seal the upper chamber contents. The concentrate vessel helix 19 may allow the concentrate vessel to collapse vertically as its contents are consumed. The concentrate vessel sealing groove 20 may couple to the concentrate vessel sealing mechanism to reduce and/or prevent leakage of the beverage concentrate from the concentrate well. The concentrate vessel may be re-usable and/or re-fillable. The concentrate vessel may be disposable and/or recyclable. The concentrate vessel may comprise a polymer, such as a biodegradable polymer. The concentrate vessel may comprise one or more of polylactic acid, cellulose, cellulosic fibers, polycaprolate, polybutyleneadipatetetephathalate, polyhydroxyalkanoate, polyethylene, polyethylene terephthalate, polyvinyl chloride, polypropylene, polystyrene, poly-D-lactide, and poly-L-lactide. The concentrate vessel may lack Bisphenol A. The concentrate vessel may comprise cellulose or cellulosic fibers.

The reservoir liquid and the concentrate vessels may be replenished as desired. The concentrate vessels are not limited to flavorings for a beverage, but may comprise medications, vitamins, herbs, alcohol, energy or weight-loss supplements, for example.

Referring to FIGS. 8-13, a beverage container lid assembly 1 may generally comprise at least one concentrate well 5 to hold a concentrate vessel 7, a concentrate vessel retainer 4 for each concentrate well 5 to secure the concentrate vessel 7 in the concentrate well 5, a feed line 11 for each concentrate well 5 comprising a feed line needle 13 to puncture the concentrate vessel 7 in the at least one concentrate well 5, a Venturi mixer 12 in fluid communication with each feed line 11, and a mixing valve 6 for each feed line 11, wherein fluid may flow from the concentrate well 5 through the feed line 11 to the Venturi mixer 12 when the mixing valve 6 is open. Fluid may flow from the concentrate vessel 7 through the feed line 11 to the Venturi mixer 12 when the mixing valve 6 is open and the concentrate vessel 7 is punctured by the feed line needle 13. No fluid may flow from the concentrate vessel through the feed line to the Venturi mixer when the mixing valve is closed and the concentrate vessel is punctured by the feed line needle.

The lid assembly 1 may comprise a concentrate vessel sealing mechanism 14 to seal each concentrate vessel 7 in the concentrate well 5 to reduce leakage of concentrate out of the concentrate well 5.

The lid assembly 1 may comprise a back-flow valve 8 in fluid communication with and upstream from the Venturi mixer 12.

The lid assembly 1 may comprise a filter (not shown) in fluid communication with and upstream from the Venturi mixer 12.

The lid assembly 1 may comprise two, three, or four concentrate wells 5 circumferentially positioned equidistant from a longitudinal axis of the Venturi mixer 12.

Figure 13:
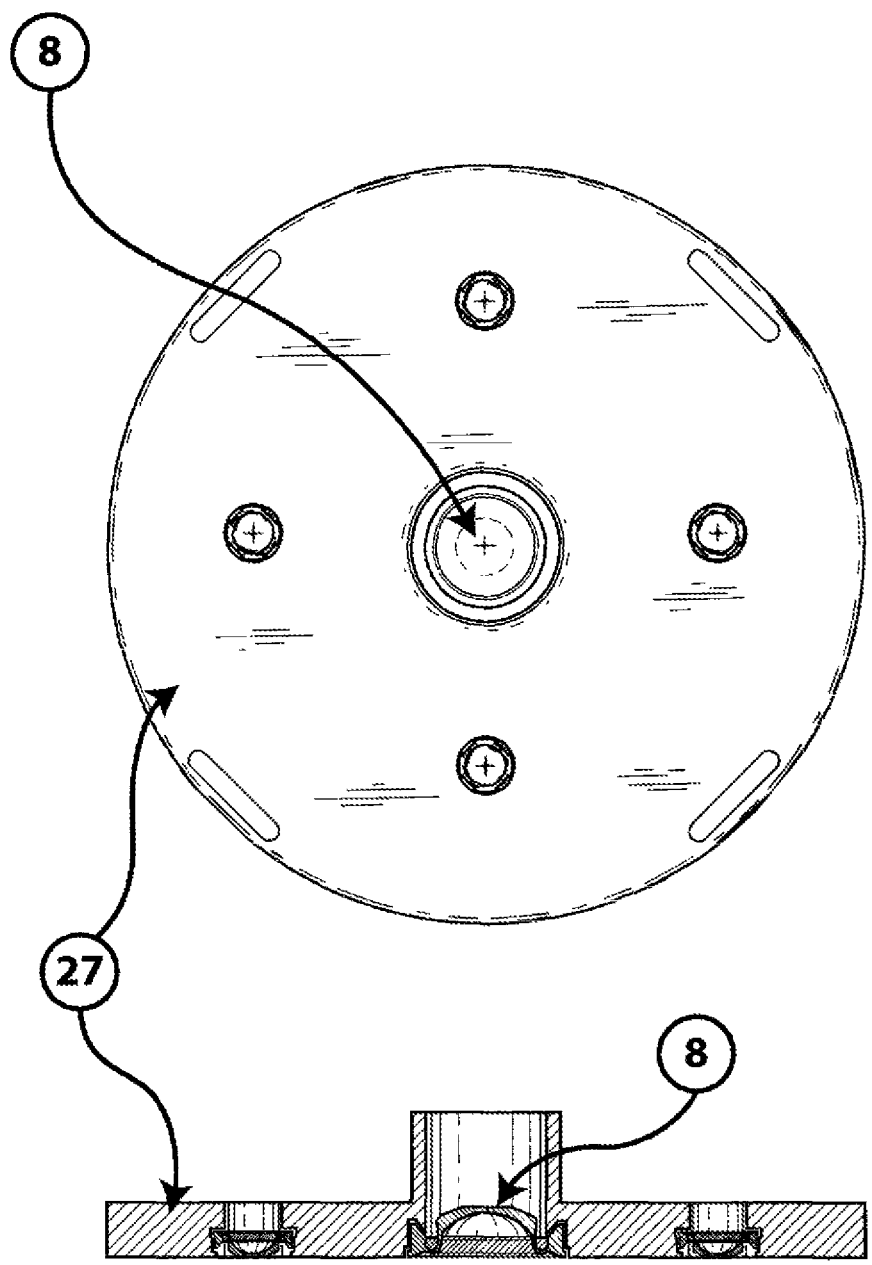
FIG. 13 illustrates a topside view of the invention.

As shown in FIG. 13, the lid assembly 1 may comprise a seal plate 27. The seal plate 27 may threadingly couple to the a neck of the lid assembly 1 to seal the concentrate well(s) 5 to prevent leakage of the beverage concentrate in the concentrate well(s) 5 or concentrate vessel 7 in the concentrate well 5. The concentrate well 5 may be configured to accommodate a concentrate vessel 7 that when inserted into the concentrate well 5 is punctured by the feed line needle 13 to dispense the beverage concentrate from the concentrate vessel 7 to the Venturi mixer 12. Alternately, the concentrate well 5 may be directly filled with the beverage concentrate such that the beverage concentrate is delivered to the Venturi mixer 12 via the feed line needle 13 in the concentrate well 5.

The seal plate 27 may comprise at least one vent (not shown) to provide venting to each of the concentrate wells 5 such that air may replace the concentrate fluid as it is drawn from the concentrate well 5 through the Venturi mixer 12. The seal plate 27 may comprise four vents when the beverage container lid assembly comprises four concentrate wells 5.

The seal plate 27 may be removably coupled to the lid assembly 1 over the concentrate well(s) 5 to retain the concentrate vessel 7 in the concentrate well 5 and/or seal the beverage concentrate in the concentrate well 5 to secure the beverage container or prevent or reduce spillage of any free concentrate liquid in the concentrate well 5. The seal plate 27 may be secured to the lid assembly 1 via any suitable mechanical interconnection or coupling structure, such as, thread or an over-center clamps) 30, for example. The seal plate 27 may comprise a back-flow valve 8 to prevent or minimize the beverage mixture from draining into the Venturi mixer 12 once the beverage mixture is formed. The seal plate 27 may be removed from the lid assembly 1 to provide access to the Venturi mixer 12 for cleaning.

The Venturi mixer 12 may comprise a central inlet along a longitudinal axis of the Venturi mixer and an inlet for each feel line 11 below the horizontal and at an angle greater than 0 degrees and less than 90 degrees relative to the longitudinal axis of the Venturi mixer. The angle may be from 15 degrees to 75 degrees, 35 degrees to 55 degrees, and 45 degrees, and 90 degrees.

A beverage container may comprise a bottom surface and a neck and a wall structure extending therebetween to form a reservoir 2 to hold a reservoir liquid, the beverage container lid assembly 1 as generally described herein removably connected to the neck, and a straw 3 extending through the lid assembly and in fluid communication with the reservoir 2 and feed line 11. The beverage container may comprise two, three, or four concentrate wells 5 circumferentially positioned equidistant from a longitudinal axis of the Venturi mixer 12.

A method for forming a beverage may generally comprise providing a first beverage concentrate to a first concentrate well of a beverage container lid assembly removably connected to a fluid container, causing flow of a reservoir liquid under vacuum from a reservoir of the fluid container to a central inlet of a Venturi mixer of the beverage container lid assembly, causing flow of the first beverage concentrate under vacuum from the first concentrate well to a first inlet of the Venturi mixer to permit flow of the beverage concentrate into the reservoir liquid via the Venturi mixer to form the beverage, and dispensing the beverage from a central outlet of the Venturi mixer. The method may comprise causing flow of the first beverage concentrate under vacuum from the first concentrate well to a mixing valve to control the amount of the first beverage concentrate that flows into the reservoir liquid. The method may comprise causing fluid to flow from the first concentrate well to the first inlet of the Venturi mixer when the mixing valve is open and no fluid flows from the first concentrate well to the first inlet of the Venturi mixer when the mixing valve is closed.

The method may comprise causing flow of the beverage under vacuum from the outlet of the Venturi mixer to a back-flow valve to prevent flow of the beverage into the reservoir liquid in the fluid container.

The method may comprise causing flow of the beverage under vacuum from the outlet of the Venturi mixer to a filter and dispensing the beverage from an outlet of the straw.

The method may comprise causing flow of the first beverage concentrate under vacuum from the first concentrate well to the first inlet of the Venturi mixer comprises flowing the beverage concentrate under vacuum into the reservoir liquid at an angle greater than 0 degrees and less than 90 degrees relative to a longitudinal axis of the Venturi mixer.

The method may comprise providing a second beverage concentrate to a second concentrate well of the beverage container lid assembly, and causing flow of the second beverage concentrate under vacuum from the second concentrate well to a second inlet of the Venturi mixer to permit flow of the second beverage concentrate into the reservoir liquid and first beverage concentrate via the Venturi mixer to form the beverage.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A beverage container lid assembly comprising:
   at least one concentrate well to hold a concentrate vessel comprising a flavoring selected from at least one of a beverage, a medication, a vitamin, an herb, alcohol, an energy supplement, and a weight-loss supplement;
   a feed line for each concentrate well comprising a feed line needle to puncture the concentrate vessel in the at least one concentrate well;
   a venturi mixer in fluid communication with each feed line; and
   a mixing valve in fluid communication with each feed line;
   wherein the concentrate well is in fluid communication with the venturi mixer when the mixing valve is open.

2. The lid assembly of claim 1, wherein fluid flows from the concentrate vessel through the feed line to the venturi mixer when the mixing valve is open and the concentrate vessel is punctured by the feed line needle.

3. The lid assembly of claim 1, wherein no fluid flows from the concentrate vessel through the feed line to the venturi mixer when the mixing valve is closed and the concentrate vessel is punctured by the feed line needle.

4. The lid assembly of claim 1, wherein the venturi mixer comprises: a central inlet along a longitudinal axis of the venturi mixer; and an inlet for each feel line below the horizontal and at an angle from greater than 0 degrees up to about 90 degrees relative to the longitudinal axis of the venturi mixer.

5. A beverage container comprising:
   a bottom surface and a neck and a wall structure extending therebetween to form a reservoir to hold a reservoir liquid; and
   the beverage container lid assembly of claim 1 removably connected to the neck.

6. A beverage container lid assembly comprising:
   at least one concentrate well to hold a concentrate vessel comprising a flavoring selected from at least one of a beverage, a medication, a vitamin, an herb, alcohol, an energy supplement, and a weight-loss supplement;

a feed line for each concentrate well comprising a feed line needle to puncture the concentrate vessel in the at least one concentrate well;
a venturi mixer in fluid communication with each feed line; and
a mixing valve for in fluid communication with each feed line;
wherein the concentrate well is in fluid communication with the venturi mixer when the mixing valve is open, and
wherein the concentrate vessel comprises a biopolymer selected from at least one of polylactic acid, cellulose, cellulosic fibers, polycaprolate, polyhydroxyalkanoate, polybutyleneadipatetetephathalate, polyethylene, polyethylene terephthalate, polyvinyl chloride, polypropylene, polystyrene, poly-D-lactide, and poly-L-lactide.

7. The lid assembly of claim 6, wherein the concentrate vessel comprises a biodegradable polymer selected from at least one of cellulose and cellulosic fibers.

8. The lid assembly of claim 6, wherein the concentrate vessel is re-fillable.

9. The lid assembly of claim 6, wherein the concentrate vessel is at least one of disposable and recyclable.

10. The lid assembly of claim 6, wherein the concentrate vessel collapses vertically along a helix when the flavoring is dispensed from the concentrate vessel.

11. The lid assembly of claim 6, wherein the concentrate vessel comprises a first volume prior to dispensing the flavoring and a second volume after dispensing the flavoring, wherein the first volume is greater than the second volume.

12. The lid assembly of claim 6, wherein the concentrate vessel comprises a first height prior to dispensing the flavoring and a second height after dispensing the flavoring, wherein the first height is greater than the second height.

13. The lid assembly of claim 6, wherein the concentrate vessel comprises a bi-chambered concentrate vessel comprising:
a lower chamber and an upper chamber separated by a partition, and
a lid to seal the upper chamber,
wherein the lower chamber includes a first concentrate and the upper chamber includes a second concentrate.

14. A beverage container comprising:
a bottom surface and a neck and a wall structure extending therebetween to form a reservoir to hold a reservoir liquid; and
a beverage container lid assembly removably connected to the neck, the beverage container lid assembly comprising
at least one concentrate well to hold a concentrate vessel comprising a flavoring selected from at least one of a beverage, a medication, a vitamin, an herb, alcohol, an energy supplement, and a weight-loss supplement,
a feed line for each concentrate well comprising a feed line needle to puncture the concentrate vessel in the at least one concentrate well,
a venturi mixer in fluid communication with each feed line, and
a mixing valve in fluid communication with each feed line,
wherein the concentrate well is in fluid communication with the venturi mixer when the mixing valve is open; and
wherein the at least one concentrate vessel comprises a first concentrate vessel comprising a first flavoring and a second concentrate vessel comprising a second flavoring, and wherein the first flavoring, the second flavoring, and reservoir liquid are different.

15. The beverage container of claim 14, wherein the first flavoring comprises a beverage flavoring, the second flavoring comprises an herb, and the reservoir liquid comprises water and lacks a beverage flavoring.

16. The beverage container of claim 15, wherein the first flavoring comprises lemon flavoring, the second flavoring comprises tea, and the reservoir liquid consists essentially of water.

17. The beverage container of claim 14, wherein the beverage comprises a first concentration when the mixing valve is in a fully opened position and a second concentration when the mixing valve is in a partially opened position, and wherein the first concentration is higher than the second concentration.

18. The beverage container of claim 14, wherein the beverage dispensed from the beverage container comprises:
a first beverage flavoring when the first mixing valve is open and the second mixing valve is closed,
a second beverage flavoring when the second mixing valve is open and the first mixing valve is closed, and
a mixture of the first beverage flavoring and the second beverage flavoring when the first mixing valve is open and the second mixing valve is open, and
the reservoir liquid when the first mixing valve is closed and the second mixing valve is closed.

19. The beverage container of claim 14, wherein the beverage dispensed from the beverage container comprises:
a beverage flavoring when the first mixing valve is open and the second mixing valve is closed,
an herb flavoring when the second mixing valve is open and the first mixing valve is closed, and
a mixture of the beverage flavoring and the herb flavoring when the first mixing valve is open and the second mixing valve is open, and
the reservoir liquid when the first mixing valve is closed and the second mixing valve is closed.

20. The beverage container of claim 14, wherein the beverage dispensed from the beverage container comprises:
lemon flavored water when the first mixing valve is open and the second mixing valve is closed,
tea when the second mixing valve is open and the first mixing valve is closed,
lemon flavored tea when the first mixing valve is open and the second mixing valve is open, and
water when the first mixing valve is closed and the second mixing valve is closed.

* * * * *